United States Patent Office 3,287,404
Patented Nov. 22, 1966

3,287,404
PROCESS FOR SEPARATING 2-METHOXY-3,6-DI-
CHLOROBENZOIC ACID FROM AN AQUEOUS
MIXTURE COMPRISING SAID ACID AND ITS
ISOMERS
Delbert L. Hanna, Oak Park, Ill., assignor to Velsicol
Chemical Corporation, Chicago, Ill., a corporation of
Illinois
No Drawing. Filed Aug. 20, 1963, Ser. No. 303,437
11 Claims. (Cl. 260—521)

This invention relates to the production of pesticidal compositions of matter. More specifically, this invention relates to the production of the chemical compound 2-methoxy-3,6-dichlorobenzoic acid.

The compound 2-methoxy-3,6-dichlorobenzoic acid is used in commerce as a very valuable herbicide for the control of a variety of weeds. It is ordinarily prepared by the methylation of 3,6-dichlorosalicylic acid with a reagent such as dimethylsulfate or methyl chloride. The process making use of methyl chloride, for example, in aqueous alkali metal base medium gives excellent yields of 2-methoxy-3,6-dichlorobenzoic acid. Several difficulties occur, however, in the final stages of the latter process which interfere with the purification of the product.

The process liquors which arise from the methylation of commercial 3,6-dichlorosalicylic acid with methyl chloride in aqueous sodium hydroxide medium, for example, comprise predominantly a mixture of the sodium salt of 2-methoxy-3,6-dichlorobenzoic acid, along with the sodium salts of the isomeric compounds 2-methoxy-3,5-dichlorobenzoic acid and 2-methoxy-4,5-dichlorobenzoic acid, in addition to sodium chloride, excess sodium hydroxide, the sodium salt of some unreacted 3,6-dichlorosalicylic acid, and other by-products, including a resinous oil of unknown composition. In order to isolate the 2-methoxy-3,6-dichlorobenzoic acid, this process liquor is first adjusted carefully to a pH of from 3.95 to 4.00 with hydrochloric acid to precipitate the 2-methoxy-3,5-dichlorobenzoic acid, which is filtered off. The pH of the filtrate, diluted with about an equal volume of water, is raised to about 8; and the mixture is filtered to remove the resinous oil which separates at this point. The clear filtrate is then acidified to precipitate the desired 2-methoxy-3,6-dichlorobenzoic acid.

In this prior process of purifying the product, it is therefore necessary to carry out two separate steps to remove impurities. One of the steps requires a careful adjustment to a pH within the critical range of only 3.95 to 4.00. It is well recognized in the art that it is extremely difficult in large scale commercial operations to adjust a pH within such a narrow range. Special equipment is required, and highly skilled operators are necessary to carry out the careful adjustments.

Such involved steps are required in the prior process because of the generally encountered difficulty in the chemical art of separating from one another compounds which are isomers of each other, as in the present case. The individual compounds usually have very similar physical properties, and they can only be separated by involved techniques requiring repeated crystallizations or fractional distillation. This step is also carried out in equipment which must be of the special material to withstand the highly acidic medium. Despite these multiple purification steps, the resulting 2-methoxy-3,6-dichlorobenzoic acid is not as pure as would be desired.

It is therefore an object of this invention to provide a method for the purification of 2-methoxy-3,6-dichlorobenzoic acid which eliminates an entire step from prior methods.

It is another object of this invention to provide a method for the purification of 2-methoxy-3,6-dichlorobenzoic acid in which one of the steps can be carried out in neutral medium.

It is further an object of this invention to provide a method for the purification of 2-methoxy-3,6-dichlorobenzoic acid which yields a product of enhanced purity.

The process of this invention for the purification of 2-methoxy-3,6-dichlorobenzoic acid from a mixture comprising said acid and its isomers comprises forming the calcium salts of said acid and its isomers.

The process of this invention is generally applicable to mixtures which comprise 2-methoxy-3,6-dichlorobenzoic acid and its isomers. Such mixtures will ordinarily be aqueous mixtures in which the acids are all present in the form of their water-soluble salts such as the sodium salts. The process is most preferably applicable to mixtures which are the process liquors resulting from the treatment of commercial 3,6-dichlorosalicylic acid with methyl chloride in a basic medium of an aqueous solution of a base such as potassium or sodium hydroxide or other alkali metal bases.

Two of the steps in the instant process comprise neutralization and reaction with a calcium halide, while another desirable but not always essential step is dilution with water. It is preferred for maximum convenience in working that the steps be carried out in the order of neutralization first, followed by dilution with water, and reaction with a calcium halide third. However, it is not essential to the successful operation of the process of this invention that these steps be carried out in this order. The dilution with water, for example, can be carried out before the neutralization, the reaction with the calcium halide being the third step. Or as another example, the reaction with the calcium halide can be carried out before the neutralization and dilution with water.

The neutralization can be accomplished by the use of a mineral acid such as hydrochloric acid or hydrobromic acid, although hydrochloric acid is the preferred acid. The neutralization can be carried out to a pH in the range of from about 5 to about 10. A preferred pH range is from about 6 to about 8.5, while a most preferred pH is about 8.

As has been noted above, it is often desirable to dilute the mixture with water. It has been found that if the aqueous mixtures are too concentrated, the precipitate of salts which forms after the reaction with calcium halide is often clay-like in texture and is difficult to handle. Further, the dilution of the mixtures has been found to aid in the separation of the resinous oils and to result in less entrainment of valuable mother liquors in the salt precipitate. While the exact degree of dilution has not been found to be critical, dilution with a volume of water about equal to the volume of the aqueous mixture is preferred.

In the step which comprises reaction with a calcium halide, the halides which can be used in the process of this invention are defined as the chlorides, the bromides or the iodides. The chlorides and bromides are preferred, and the chlorides are most preferred. These halides can be used in the various known forms such as $CaCl_2$, $CaCl_2 \cdot H_2O$, $CaCl_2 \cdot 2H_2O$, $CaCl_2 \cdot 6H_2O$, $CaBr_2$ $CaBr \cdot 6H_2O$ $CaI_2$, and $CaI_2 \cdot 6H_2O$.

The process of this invention is based on the surprising and unexpected discovery that while the calcium salt of 2-methoxy-3,6-dichlorobenzoic acid is readily soluble in water, calcium salts of the isomeric compounds 2-methoxy-3,5-dichlorobenzoic acid and 2-methoxy-4,5-dichlorobenzoic acid are quite insoluble in water. One skilled in the art would ordinarily expect that these closely related compounds, differing only by the positions of the chlorine atoms on the aromatic ring, would have about the same water solubility. The difference in solubilities, however, is actually marked and enables the 2-methoxy-3,6-dichlorobenzoic acid to be isolated readily from its isomers in pure form.

It has surprisingly been found that while the method of this invention requires the formation of the calcium salts of 2-methoxy-3,6-dichlorobenzoic acid, its isomers, and other intermediates and by-products arising in the production process, inorganic calcium salts in general have not been found satisfactory for use in forming the organic salts. Calcium sulfate, calcium phosphate, and calcium hydroxide, for example, are far too insoluble in water to be used practically. Other salts such as calcium acetate and calcium nitrate are sufficiently water soluble; but when the mixtures are subsequently acidified to precipitate the desired 2-methoxy-3,6-dichlorobenzoic acid, the free acetic and nitric acids form. The presence of such acids is undesirable, since the nitric acid can react with the product to nitrate or decarboxylate the desired product while the acetic acid will tend to make the desired product too soluble. Therefore, the calcium halides have been found to be the desirable calcium salts for use in the method of this invention.

The calcium halides can be added to the mixtures as the solid or as an aqueous solution, which is generally the most convenient form. The exact amount of the calcium halide will be dependent upon the particular halide used and the properties of the individual mixtures, but generally it is desirable to use sufficient calcium halide to attain a concentration of from about 1.5% to about 4.5% by weight of calcium halide in the total aqueous system. A concentration of about 2% is preferred. For the most preferred halide, calcium chloride, an upper limit of about 3.0% is preferred. After the neutralization and calcium halide reaction, the aqueous system is generally stirred for several hours to complete the formation of salts with certain of the benzoic acid derivatives and to develop the precipitated salts into a physical form suitable for efficient separation. The separation of the solid can be effected by filtration, centrifugation, or other techniques known to the art. This solid will comprise the salts of the undesired isomers 2-methoxy-3,5-dichlorobenzoic acid and 2-methoxy-4,5-dichlorobenzoic acid and salts of the various unreacted salicylates and will also comprise the objectionable oils.

Some entrainment of the aqueous solution of salts of 2-methoxy-3,6-dichlorobenzoic acid in the separated solid will occur. For this reason, better recovery of the desired salts can be obtained by washing the solids with an aqueous solution containing the same concentration of calcium halide and alkali metal halide as in the filtrate from the solid.

The filtrate, and washings if used, will comprise the desired 2-methoxy-3,6-dichlorobenzoic acid, largely in the form of its alkali metal salt with some of its calcium salt. The free acid can be separated by acidification of its salt solution with hydrobromic acid or, preferably, hydrochloric acid. Acidification to a pH of about 1 or less is desired, since high pH's tend to promote oiling out. The precipitated solid can then simply be separated, washed, and dried to give a high yield of the 2-methoxy-3,6-dichlorobenzoic acid in very pure form.

All the steps in the process of this invention are ordinarily carried out at normal room temperature. Higher or lower temperatures may well be used without interfering with the isolation method, but such temperatures requiring external heating or cooling are not required. Similarly, atmospheric pressure is ordinarily employed, but sub- or superatmospheric pressures can be used if desired.

The following Example 1 serves to illustrate a typical methylation of commercial 3,6-dichlorosalicylic acid with methyl chloride.

*Example 1*

Commercial 3,6-dichlorosalicylic acid and water were charged into a suitable pressure vessel rated at 100 p.s.i.g. (100° C.) and fitted with a gas inlet, an aqueous caustic inlet, provision for reflux, an agitator, and a jacket for 150 lbs. of steam. An aqueous solution of caustic soda was then added until a pH of 9.0 was attained. At this point, the solution was heated to 85° C., and methyl chloride gas was charged to a pressure of about 90 p.s.i.g. These reaction conditions were maintained for about 10 hrs., the pressure being held constant by the addition of methyl chloride gas as required with a pressure regulator while a pH of about 9.5 was maintained by adding aqueous caustic soda as required with a pH controller. The pressure vessel was then bled down, and one mole of aqueous caustic soda was added for each mole of 3,6-dichlorosalicylic acid charged. The solution was then refluxed for about 6 hrs. and cooled.

The process liquor obtained in this example comprises predominantly the sodium salt of 2-methoxy-3,6-dichlorobenzoic acid, along with the sodium salts of the isomeric compounds 2-methoxy-3,5-dichlorobenzoic acid and 2-methoxy-4,5-dichlorobenzoic acid, in addition to sodium chloride, excess sodium hydroxide, the sodium salt of unreacted 3,6-dichlorosalicylic acid, and other by-products, including a resinous oil of unknown composition.

In the prior purification technique, this process liquor is adjusted carefully to a pH of from 3.95 to 4.00 with hydrochloric acid to precipitate the 2-methoxy-3,5-dichlorobenzoic acid, which is filtered off. The filtrate is diluted with about an equal volume of water, and the pH of the solution is raised to about 8 with sodium hydroxide solution. The mixture is then filtered again to remove the resinous oil which separates at this point. The filtrate is finally acidified again with hydrochloric acid to precipitate the product, 2-methoxy-3,6-dichlorobenzoic acid, which is filtered off, washed, and dried.

The following examples illustrate the manner in which the desired 2-methoxy-3,6-dichlorobenzoic acid can be isolated in pure form from such process liquors by the method of this invention.

*Example 2*

A 500-cc. sample of process liquor as obtained in Example 1 was neutralized with hydrochloric acid to a pH of about 8. The neutralized solution was diluted with 500 cc. of water, and the diluted solution was treated with a solution of 20 g. of calcium chloride in 30 cc. of water. About 20 g. of diatomaceous silica filter aid was added, and the mixture was stirred for 2 hrs. and filtered with suction. The filter cake was washed with an aqueous solution containing calcium chloride and sodium chloride in the same concentrations as the filtrate. The 2-methoxy-3,6-dichlorobenzoic acid was then separated from the mother liquor filtrate as well as from the washings filtrate by acidification with hydrochloric acid to a pH of 1, suction filtration, water washing, and drying. The products obtained from the mother liquor and from the washings analyzed 89.8% and 89.1% 2-methoxy-3,6-dichlorobenzoic acid, respectively. The product obtained from the same process liquor by the prior purification technique analyzed 78.2% 2-methoxy-3,6-dichlorobenzoic acid.

*Example 3*

A 250-cc. sample of process liquor as obtained in Example 1, neutralized to a pH of about 8 with hydrochloric acid, was diluted with an equal volume of water. The diluted liquor was treated with 20 cc. of an aqueous solution containing 10 g. of calcium chloride. The mixture was then worked up in the manner given in the previous example to yield 30.0 g. of product which assayed 91.8% 2-methoxy-3,6-dichlorobenzoic acid. The product obtained from the same process liquor by the prior purification technique assayed 85.7% 2-methoxy-3,6-dichlorobenzoic acid.

Example 4

A large scale run was carried out in which 116 lbs. of neutralized (pH 8) process liquor as obtained in Example 1 was diluted with 100 lbs. of water and treated with 4 lbs. of calcium chloride in 6 lbs. of water. The mixture was stirred for 2.5 hrs. and then centrifuged for 3 hrs. The filtrate was adjusted to a pH of 1 with hydrochloric acid, and the precipitate was centrifuged, washed, and dried to give a product which assayed 92.1% 2-methoxy-3,6-dichlorobenzoic acid. The use of the prior purification technique gave a product from the same process liquor which assayed 85.5% 2-methoxy-3,6-dichlorobenzoic acid.

Example 5

A 500-cc. sample of process liquor as obtained in Example 1 is neutralized with hydrochloric acid to a pH of about 5. The neutralized solution is diluted with 500 cc. of water, and the diluted solution is treated with 1.5% by weight of calcium chloride. About 20 g. of diatomaceous silica filter aid is added, and the mixture is stirred for 2 hrs. and filtered with suction. The filter cake is washed with an aqueous solution containing calcium chloride and sodium chloride in the same concentrations as in the filtrate. The product is then separated from the combined filtrate and washings by acidification with hydrochloric acid to a pH of about 1, suction filtration, water washing, and drying. The solid product so obtained contains 2-methoxy-3,6-dichlorobenzoic acid in high assay.

Example 6

A 500-cc. sample of process liquor as obtained in Example 1 is neutralized to a pH of about 10 with hydrochloric acid. The neutralized solution is diluted with 500-cc. of water, and the diluted solution is treated with 3.0% by weight of calcium bromide. About 20 g. of diatomaceous filter aid is added, and the mixture is stirred for 2 hrs. and filtered with suction. The filter cake is washed with an aqueous solution containing calcium bromide and sodium chloride in the same concentration as in the filtrate. The product is then isolated as described in the previous example to give a solid which has an excellent assay for 2-methoxy-3,6-dichlorobenzoic acid.

Example 7

A 500-cc. sample of process liquor as obtained in Example 1 is neutralized with hydrochloric acid to a pH of about 6. The neutralized solution is diluted with 500 cc. of water, and the diluted solution is treated with 4.5% by weight of calcium iodide. About 20 g. of diatomaceous silica filter aid is added, and the mixture is stirred for 2 hrs. and filtered with suction. The filter cake is washed with an aqueous solution containing calcium iodide and sodium chloride in the same concentrations as in the filtrate. The product is then isolated as described in Example 5 to give a solid which has an excellent assay for 2-methoxy-3,6-dichlorobenzoic acid.

Example 8

A 500-cc. sample of process liquor as obtained in Example 1 is neutralized with hydrochloric acid to a pH of 8.5. The neutralized solution is diluted with 500 cc. of water, and the diluted solution is treated with 3.0% by weight of calcium chloride. About 20 g. of diatomaceous silica filter aid is added, and the mixture is stirred for 2 hrs. and filtered with suction. The filter cake is washed with an aqueous solution containing calcium chloride and sodium chloride in the same concentrations as in the filtrate. The product is then isolated as described in Example 5 to give a solid which has an excellent assay for 2-methoxy-3,6-dichlorobenzoic acid.

I claim:

1. A process for the purification of the water-soluble salts of 2-methoxy-3,6-dichlorobenzoic acid from an aqueous mixture comprising the water soluble salts of said acid and its isomers which comprises forming the calcium salts of said acid and its isomers at a pH of from about 5 to about 10 by reacting said mixture with a calcium halide and removing the resulting solid.

2. A process for the purification of the water-soluble salts of 2-methoxy-3,6-dichlorobenzoic acid from an aqueous mixture comprising the water soluble salts of said acid and its isomers which comprises neutralizing the mixture to a pH of from about 5 to about 10 and reacting the mixture with a calcium halide and removing the resulting solid.

3. A process for the purification of a 2-methoxy-3,6-dichlorobenzoic acid from an aqueous mixture comprising the water soluble salts of said acid and its isomers which comprises neutralizing the mixture and reacting the mixture to a pH of from about 5 to about 10 with a calcium halide, removing the resulting solid, acidifying the filtrate with an acid selected from the group consisting of hydrochloric acid and hydrobromic acid, and recovering the 2-methoxy-3,6-dichlorobenzoic acid therefrom.

4. A process for the purification of 2-methoxy-3,6-dichlorobenzoic acid from an aqueous mixture comprising the water soluble salts of said acid and its isomers which comprises neutralizing the mixture to a pH of from about 5 to about 10; diluting the mixture with water; reacting the mixture with a calcium halide selected from the group consisting of calcium chloride, calcium bromide, and calcium iodide; removing the resulting solid; and acidifying the filtrate with an acid selected from the group consisting of hydrochloric acid and hydrobromic acid to a pH of a maximum of about 1.

5. A process for the purification of 2-methoxy-3,6-dichlorobenzoic acid from an aqueous mixture comprising the water soluble salts of said acid and its isomers which comprises neutralizing the mixture to a pH of from about 6 to about 8.5 with an acid selected from the group consisting of hydrochloric acid and hydrobromic acid; diluting the mixture with water; reacting the mixture with from about 1.5% to about 4.5% by weight of a calcium halide selected from the group consisting of calcium chloride and calcium bromide; removing the resulting solid; acidifying the filtrate to a pH of a maximum of about 1 with an acid selected from the group consisting of hydrochloric acid and hydrobromic acid; and recovering the 2-methoxy-3,6-dichlorobenzoic acid therefrom.

6. A process for the purification of 2-methoxy-3,6-dichlorobenzoic acid from an aqueous mixture comprising the water soluble salts of said acid and its isomers which comprises neutralizing the mixture to a pH of about 8 with hydrochloric acid; diluting the mixture with water; reacting the mixture with about 2% by weight of a calcium halide selected from the group consisting of calcium chloride and calcium bromide; removing the resulting solid; and acidifying the filtrate to a pH of a maximum of about 1 with hydrochloric acid.

7. The process for the purification of 2-methoxy-3,6-dichlorobenzoic acid from its process liquors produced by the reaction of 3,6-dichlorosalicylic acid with methyl chloride in aqueous alkali metal base medium which comprises neutralizing the said process liquors to a pH of from about 5 to about 10, reacting the neutralized liquors with calcium chloride, removing the resulting solids, acidifying the remaining filtrate, and recovering the 2-methoxy-3,6-dichlorobenzoic acid therefrom.

8. The process for the purification of 2-methoxy-3,6-dichlorobenzoic acid from its process liquors produced by the reaction of 3,6-dichlorosalicylic acid with methyl chloride in aqueous alkali metal base medium which comprises neutralizing the process liquors to a pH of from about 5 to about 10, diluting the neutralized process liquors with water, reacting the neutralized and diluted liquors with calcium chloride, removing the resulting solids, acidifying the remaining filtrate to a pH of a maximum of about 1, and recovering the 2-methoxy-3,6-dichlorobenzoic acid therefrom.

9. The process for the purification of 2-methoxy-3,6-dichlorobenzoic acid from its process liquors produced by the reaction of 3,6-dichlorosalicylic acid with methyl chloride in aqueous alkali metal base medium which comprises neutralizing the process liquors to a pH of from about 6 to about 8.5 with an acid selected from the group consisting of hydrochloric acid and hydrobromic acid, diluting the neutralized process liquors with water, reacting the neutralized and diluted liquors with from about 1.5% to about 3.0% by weight of calcium chloride, removing the resulting solids, acidifying the remaining filtrate to a pH of a maximum of about 1 with an acid selected from the group consisting of hydrochloric acid and hydrobromic acid, and recovering the 2-methoxy-3,6-dichlorobenzoic acid therefrom.

10. The process for the purification of 2-methoxy-3,6-dichlorobenzoic acid from its process liquors produced by the reaction of 3,6-dichlorosalicyclic acid with methyl chloride in aqueous sodium hydroxide medium which comprises neutralizing the process liquors to a pH of about 8 with hydrochloric acid, diluting the neutralized process liquors with water, reacting the neutralized and diluted liquors with about 2% by weight of calcium chloride, removing the resulting solids, acidifying the remaining filtrate to a pH of a maximum of about 1 with hydrochloric acid, and recovering the 2-methoxy-3,6-dichlorobenzoic acid therefrom.

11. A process for the purification of 2-methoxy-3,6-dichlorobenzoic acid from an aqueous mixture comprising the water-soluble salts of said acid and its isomers which comprises reacting the mixture with a calcium halide, neutralizing the mixture to a pH of from about 5 to about 10 and removing the resulting solid.

No references cited.

LORRAINE A. WEINBERGER, *Primary Examiner.*

S. B. WILLIAMS, *Assistant Examiner.*

UNITED STATES PATENT OFFICE
CERTIFICATE OF CORRECTION

Patent No. 3,287,404                                          November 22, 1966

Delbert L. Hanna

It is hereby certified that error appears in the above numbered patent requiring correction and that the said Letters Patent should read as corrected below.

Column 6, line 11, strike out "a"; lines 14 and 15, strike out "and reacting the mixture to a pH of from about 5 to about 10 with a" and insert instead -- to a pH of from about 5 to about 10 and reacting the mixture with a --.

Signed and sealed this 12th day of September 1967.

(SEAL)
Attest:

ERNEST W. SWIDER                                EDWARD J. BRENNER
Attesting Officer                                    Commissioner of Patents